US007515508B1

(12) United States Patent

Stotz

(10) Patent No.: US 7,515,508 B1

(45) Date of Patent: Apr. 7, 2009

(54) INDICATOR ASSEMBLY FOR A WEARABLE ELECTRONIC DEVICE

(75) Inventor: Gerhard Stotz, Eisingen (DE)

(73) Assignee: Timex Group B.V. (NL)

(*) Notice: Subject to any disclaimer, the term of this patent is extended or adjusted under 35 U.S.C. 154(b) by 0 days.

(21) Appl. No.: 12/046,947

(22) Filed: Mar. 12, 2008

(51) Int. Cl.

| | |
|---|---|
| ***G04B 19/00*** | (2006.01) |
| ***G04B 19/04*** | (2006.01) |
| ***F16H 19/04*** | (2006.01) |
| ***G01D 5/00*** | (2006.01) |
| ***G09F 9/00*** | (2006.01) |

(52) U.S. Cl. ............................ 368/80; 368/223; 74/30; 116/282; 116/308

(58) Field of Classification Search .................. 368/76, 368/80, 97, 101, 223, 228; 74/29, 30; 116/261, 116/282, 308

See application file for complete search history.

(56) References Cited

U.S. PATENT DOCUMENTS

| | | | | |
|---|---|---|---|---|
| 259,688 | A | | 6/1882 | Hollander |
| 991,235 | A | | 5/1911 | Porter |
| 1,776,001 | A | | 9/1930 | Konigsberg |
| 2,221,413 | A | | 11/1940 | Schanz |
| 2,292,458 | A | * | 8/1942 | Maser ......................... 368/80 |
| 2,333,832 | A | | 11/1943 | Torroja |
| 3,852,949 | A | * | 12/1974 | Sayler ......................... 368/76 |
| 3,868,696 | A | | 2/1975 | Post et al. |
| 3,956,879 | A | | 5/1976 | Bailey |
| 4,024,767 | A | * | 5/1977 | Kampf ...................... 73/866.1 |
| 4,161,098 | A | * | 7/1979 | Ingendahl .................... 368/76 |
| 4,411,165 | A | * | 10/1983 | Evans ............................ 74/63 |
| 5,199,006 | A | * | 3/1993 | Ferrara ........................ 368/76 |
| 2006/0207358 | A1 | * | 9/2006 | Tung ............................. 74/30 |
| 2007/0070819 | A1 | | 3/2007 | Choksi et al. |

FOREIGN PATENT DOCUMENTS

| | | |
|---|---|---|
| EP | 1416339 | 5/2004 |

* cited by examiner

*Primary Examiner*—Vit W Miska

(74) *Attorney, Agent, or Firm*—Carmody & Torrance LLP

(57) ABSTRACT

An indicator assembly for a wearable electronic device having a dial, a slotted opening therein and surface indicia to which an indicator can point and convey information thereby, wherein the indicator assembly comprises a track assembly comprising a first track and a second track spaced apart and aligned parallel thereto, wherein each track includes teeth running along at least a respective portion thereof, wherein the teeth of the respective tracks are in facing alignment; a track assembly gearing assembly that meshingly engages the teeth of the first and second tracks and the gears of a gear assembly so that the track assembly moves linearly; an indicating assembly coupled to the track assembly and extending through the slotted opening in the dial, wherein the linear movement of the track assembly causes the indicating assembly to move linearly in the slotted opening; whereby an indicator of the indicating assembly conveys information by referring to particular surface indicia on the dial.

17 Claims, 8 Drawing Sheets

INDICATOR ASSEMBLY FOR A WEARABLE ELECTRONIC DEVICE

BACKGROUND OF THE INVENTION

The present invention is directed generally to wearable electronic devices of the type wherein indicia are provided, preferably on the dial, and an indicator is used to convey information by referring to particular surface indicia on the dial. In particular, the present invention is directed to an indicator assembly for use in such a wearable electronic device, wherein the indicator assembly utilizes an indicator that moves in a linear direction.

Generally speaking, use of indicators that move linearly are known. For example, U.S. Publication No. 2007/0070819 describes a linear time display that uses a driving gear train that comprises two screws that serve as the driving means and a guide rail that serves as guiding means.

However, it is believed that further advances to the state of the art are both desirable and achievable. For example, it would be desirable to provide a linear indicator in which a gearing assembly drives a track assembly to which the indicator is coupled, so that the indicator and the track assembly move together. It is believed that the present invention provides such advances in a novel and non-obvious manner.

SUMMARY AND OBJECTIVES OF THE INVENTION

It is thus an objective of the present invention to overcome the perceived deficiencies in the prior art.

Specifically, it is an objective of the present invention to provide an improved indicator assembly in which the indicator moves linearly.

In addition, it is an objective of the present invention to be able to indicate a variety of parameters such as those disclosed herein, using a linear indicator.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, a preferred embodiment of the present invention is, generally speaking, directed to an indicator assembly for a wearable electronic device, wherein the electronic device comprises a dial having (i) a dial side and an opposing side, (ii) a slotted opening therein and (iii) surface indicia to which an indicator can point and convey information thereby, a gearing assembly positioned on the opposing side of the dial and comprising one or more rotatable gears, an actuation mechanism positioned on the opposing side of the dial for rotating the one or more gears of the gearing assembly and a controller positioned on the opposing side of the dial for causing the actuation mechanism to rotate the one or more gears of the gearing assembly, wherein the indicator assembly comprises a track assembly comprising a first track and a second track spaced apart and aligned parallel thereto, wherein each track includes teeth running along at least a respective portion thereof, wherein the teeth of the respective tracks are in facing alignment; a track assembly gearing assembly that meshingly engages the teeth of the first and second tracks and the gears of the gear assembly so that the track assembly moves linearly; an indicating assembly coupled to the track assembly and extending through the slotted opening in the dial, wherein the linear movement of the track assembly causes the indicating assembly to move linearly in the slotted opening, wherein the indicating assembly comprises an indicator; whereby the indicator conveys information by referring to particular surface indicia on the dial.

In a preferred embodiment, the wearable electronic device is a timepiece in the form of a wristwatch.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Figure 2:
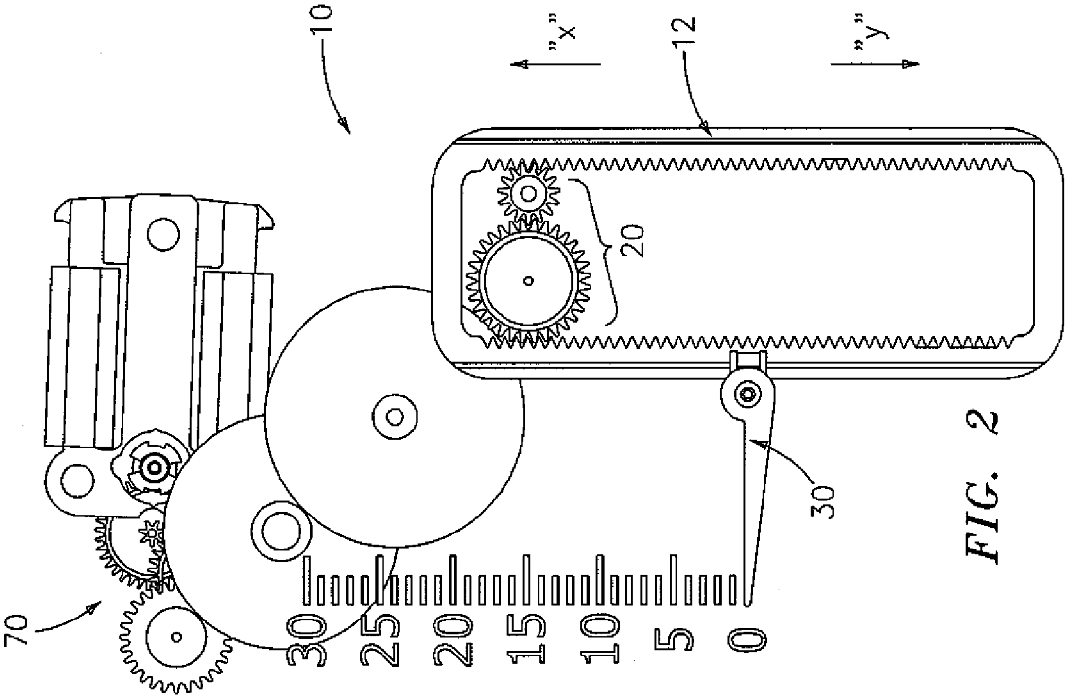
FIG. 2 is a plan view of the indicator assembly of FIG. 1, illustrating a snapshot in time in which the track assembly has moved in a linear direction and thus illustrating the indicator conveying specific information different from that being conveyed and illustrated in FIG. 1.
Figure 1:
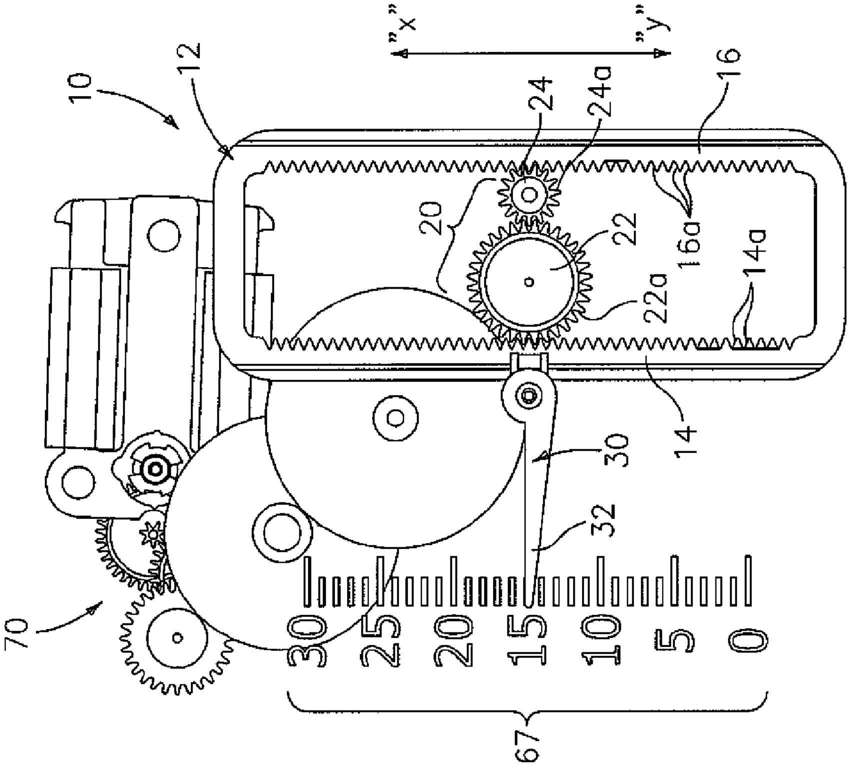
FIG. 1 is a plan view of an indicator assembly for a wearable electronic device constructed in accordance with a preferred embodiment of the present invention.
Figure 3:
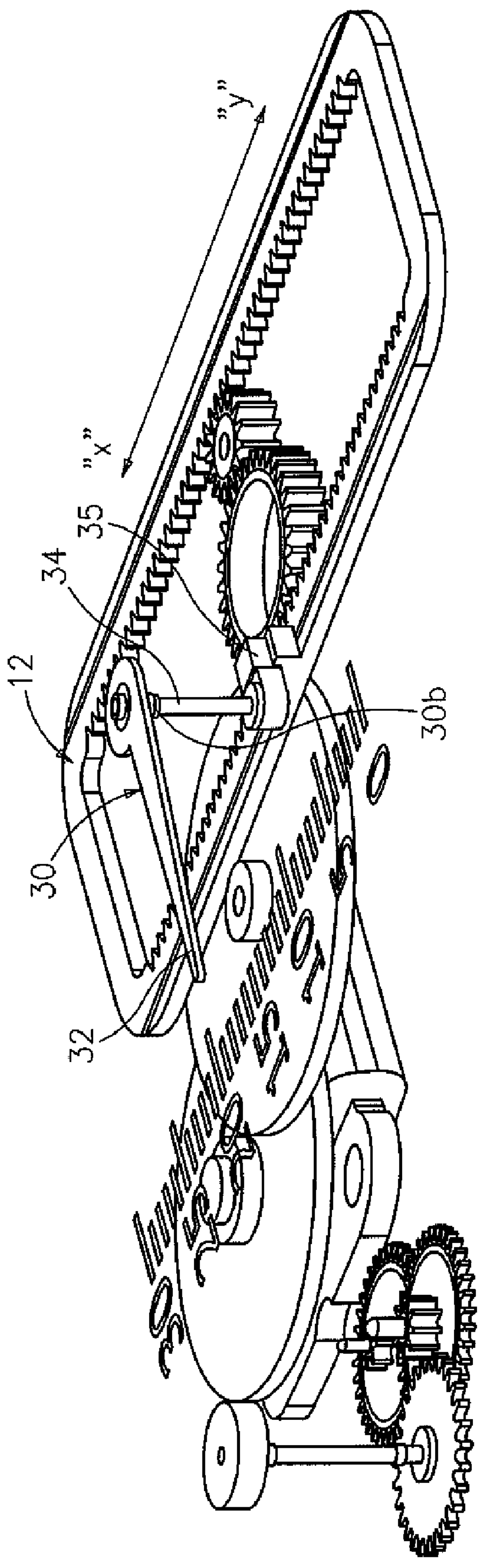
FIG. 3 is a simplified perspective view of the indicator assembly of FIG. 1.

Reference is first made generally to FIGS. 1-5, which illustrate an indicator assembly, generally indicated at 10, constructed in accordance with a preferred embodiment of the present invention. In the preferred construction, indicator assembly 10 is part of a wearable electronic device 50, which is preferably a timepiece in general and a wristwatch in particular. Wearable electronic device 50 may comprise other features and parts not material to the present invention. Nonessential details of the present invention can be found in coowned U.S. Pat. No. 7,113,450 (the "450 patent), the subject matter of which is fully incorporated by reference as if fully set forth herein.

In accordance with a preferred embodiment, indicator assembly 10 comprises a track assembly, generally indicated at 12, comprising a first track 14 and a second track 16 spaced apart and aligned parallel thereto. Preferably, the first track 14 and second track 16 are integrally coupled together to form a frame, as illustrated in the figures. Each track 14, 16 includes teeth (shown by reference numbers 14*a*, 16*a* respectively) running along at least a respective portion thereof. As illustrated, the teeth 14*a*, 16*a* of the respective tracks 14, 16 are in facing alignment.

Indicator assembly 10 also comprises a track assembly gearing assembly, generally indicated at 20, that meshingly engages the teeth 14*a*, 16*a* of the first and second tracks 14, 16 and the gears of a gear assembly, generally indicated at 70 and discussed further below, so that the track assembly 12 moves linearly in the direction of arrows "x" and "y." Preferably, track assembly gearing assembly 20 comprises a first gear 22 having teeth 22*a* on an outer circumference thereof and a second gear 24 having teeth 24*a* on an outer circumference thereof. In this way, the first gear 22 meshingly engages the teeth 14*a* of the first track 14 and one of the gears of the gear assembly 70 (as discussed below but clearly illustrated in the figures) and the second gear 24 meshingly engages the teeth 16*a* of the second track 16 and the teeth 22*a* of the first gear 22. The position of gears 22 and 24 remain constant but do rotate on pivots or studs as would be understood in the art.

In accordance with a feature and objective of the present invention, gears 22 and 24 rotate at the same circumferential speed (but in different directions), such that the rate of rotation of the first and second gears 22, 24 cause the first and second tracks 14, 16 to move linearly (i.e. in directions "x" and "y"), at least at essentially the same rate (i.e. there is essentially no twisting of track assembly 20) and in at least essentially the same direction (i.e. parallel to each other).

An indicating assembly 30, generally indicated at 30, is coupled to the track assembly 12, such as by being coupled to track 14. In the preferred embodiment, indicating assembly 30 moves with track assembly 12. That is, in the preferred embodiment, indicating assembly 30 does not move relative to track assembly 12. As will be disclosed in greater detail below, indicating assembly 30 extends through a slotted opening in the dial of the wearable electronic device 50, such that the linear movement of the track assembly 12 in directions "x" and "y" causes the indicating assembly 30 to move linearly in the slotted opening. In this way, indicating assembly 30, and in particular, an indicator 32, conveys information by referring to particular surface indicia (i.e. indicia 67) on the dial. Such surface indicia may be scale such as that shown in the figures with demarcations from "0" to "30" but this is by example and not limitation as further disclosed below. As can be contrasted in FIGS. 1 and 2, FIG. 1 has indicator 32 pointing to a value of "15," while FIG. 2 has indicator 32 pointing to "0."

Reference is briefly made to the figures in connection with a short disclosure of indicating assembly 30. In a preferred embodiment, indicating assembly 30 comprises indicator 32 which itself is mounted to one end of a stud 34. The other end of stud 34 may be secured to base 35 on track assembly 12, as illustrated for example in FIG. 3. Base 35 may be integrally formed (e.g. during the molding process) with track assembly 12 or it may be mounted on and secured thereto by adhesives or any other adequate form of bonding. Stud 34 may likewise be integrally formed or adhered/secured with/to base 35 and/or track 12 as design and routine manufacturing choices would dictate. Similarly, indicator 32 may be integrally formed or adhered/secured with/to stud 34. The point of the foregoing is to emphasize that indicating assembly 30 is not intended to have a single required construction, but rather be interpreted only by the functional and design advantages set forth herein. To be clear however, indicator 32 likewise moves linearly with track assembly 12. That is, indicator 32 is not intended to rotate, spin or otherwise move other than in directions "x" and "y" and as illustrated when contrasting FIGS. 1 and 2. Moreover, in a preferred embodiment, it is stud 34 that actually extends through the slotted opening in the dial, but that is a design choice and not a requirement, as the indicating assembly 30 could be configured slightly different (e.g. shorten stud 34 and elongate an end 30*b* of indicator 32) and still achieve all of the objectives herein.

Figure 4:
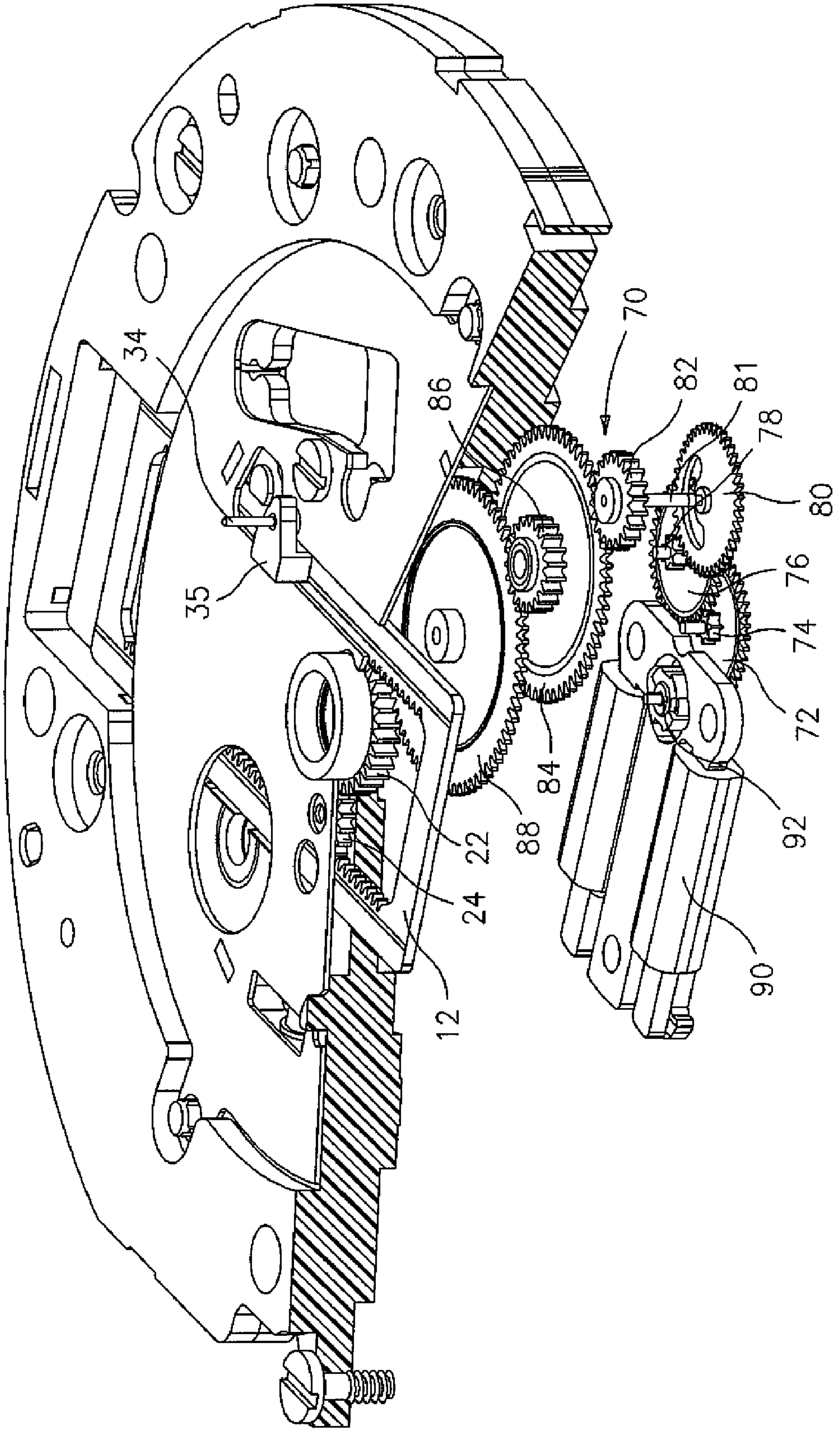
FIG. 4 is a perspective cut-away view of a module of a wearable electronic device constructed in accordance with a preferred embodiment of the present invention and incorporating the indicator assembly of FIG. 1.
Figure 5:
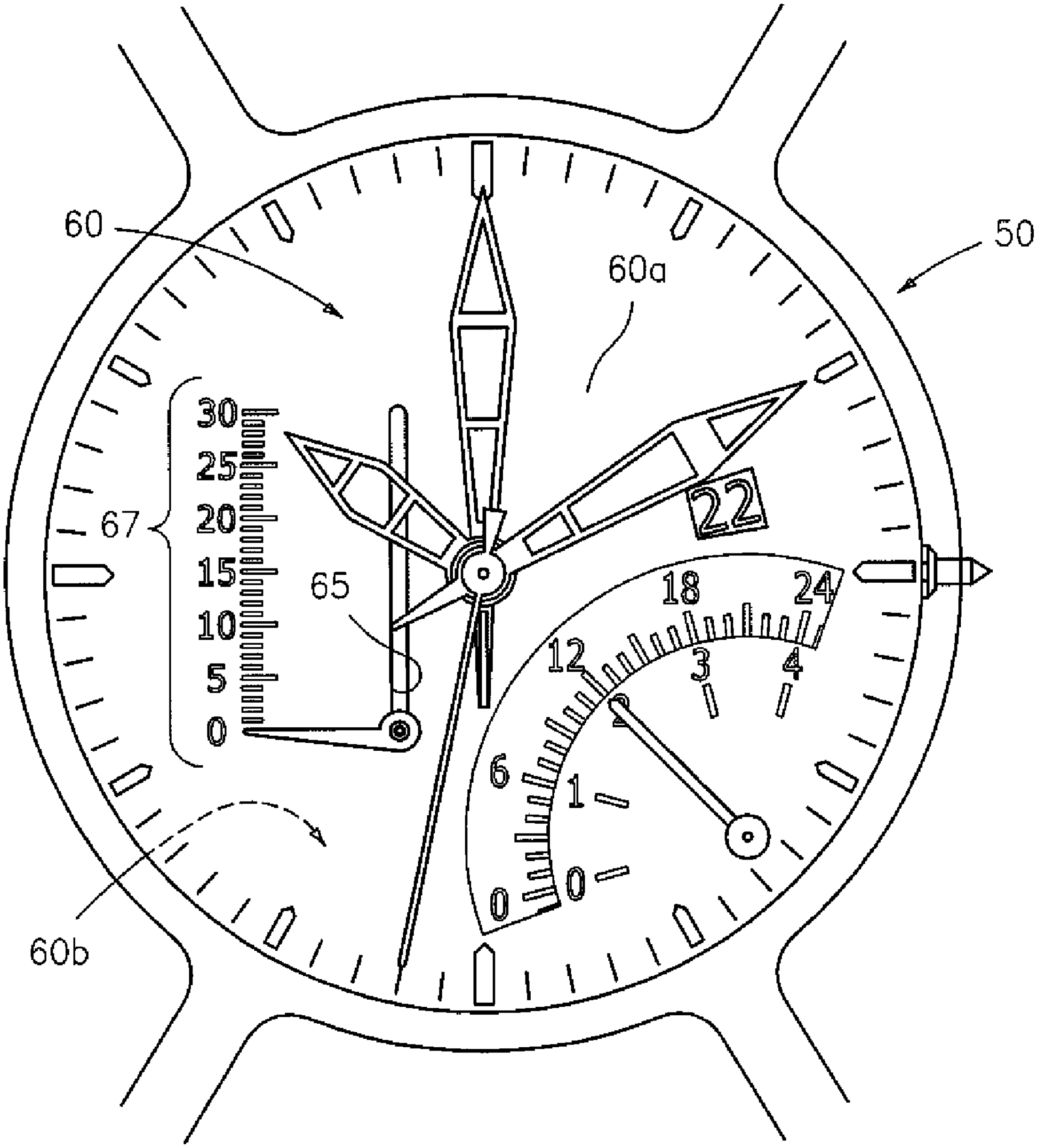
FIG. 5 is a top plan view from the dial side of the wearable electronic device constructed in accordance with a preferred embodiment of the present invention.

Reference is now specifically made to FIGS. 4 and 5 for a discussion of some of the features of the wearable electronic device that provide for the operation of indicator assembly 10. For example, in a preferred embodiment, wearable electronic device 50 comprises a dial 60 having (i) a dial side 60*a* and an opposing side 60*b*, (ii) a slotted opening 65 therein and (iii) surface indicia 67 to which indicator 32 can point and convey information thereby. Wearable electronic device 50 also comprises a gearing assembly generally indicated at 70, positioned on the opposing side 60*b* of the dial 60, that comprises one or more rotatable gears. An actuation mechanism 90, also positioned on the opposing side 60*b* of the dial 60, rotates the one or more gears of the gearing assembly 70.

Specifically, indicator assembly 10 is operatively coupled to actuation mechanism 90 so as to move indicator assembly 10 linearly in directions "x" and/or "y." In a preferred embodiment, actuation mechanism 90 is a stepping motor, and preferably a bi-directional stepping motor. In a preferred embodiment, gearing assembly 70 operatively couples motor 90 to indicator assembly 10 in the following manner, namely, gear assembly 70 comprises a gear 72 on which is a pinion 74, which is meshingly coupled to teeth on a gear 76, which itself includes a pinion 78. Pinion 78 is in meshing alignment with yet another gear 80. Due to spacing and alignment requirements, gear 80 is preferably directly coupled to a gear 82 via a coupling member 81. Gear 82 likewise has teeth that meshingly align with teeth on the outer circumference of a gear 84. Gear 84 includes a pinion 86, which is meshingly coupled to teeth on a driving gear 88. And finally in this preferred embodiment, there will be final meshing between driving gear 88 and teeth 22*a* of first gear 22. As illustrated, track assembly 12 is spaced so as to permit the teeth 22*a* of gear 22 to simultaneously mesh with gear 24 and the teeth of gear 88.

It should be understood that the number of gears and number of teeth on each gear may be more or less (or different as the case may be) than that set forth herein, and are really one of design choice for the intended function and based upon a number of known criterions, such as power and torque constraints. The selection of a suitable stepping motor and the arrangement and/or positioning of the components are all within the purview of one skilled in the art.

In this way, the rotation of a rotor 92 of motor 90, which is meshingly coupled to the teeth of gear 72, can cause the rotation of gearing assembly 70 and gearing assembly 20 and ultimately, the linear movement of track assembly 12.

Figure 6:
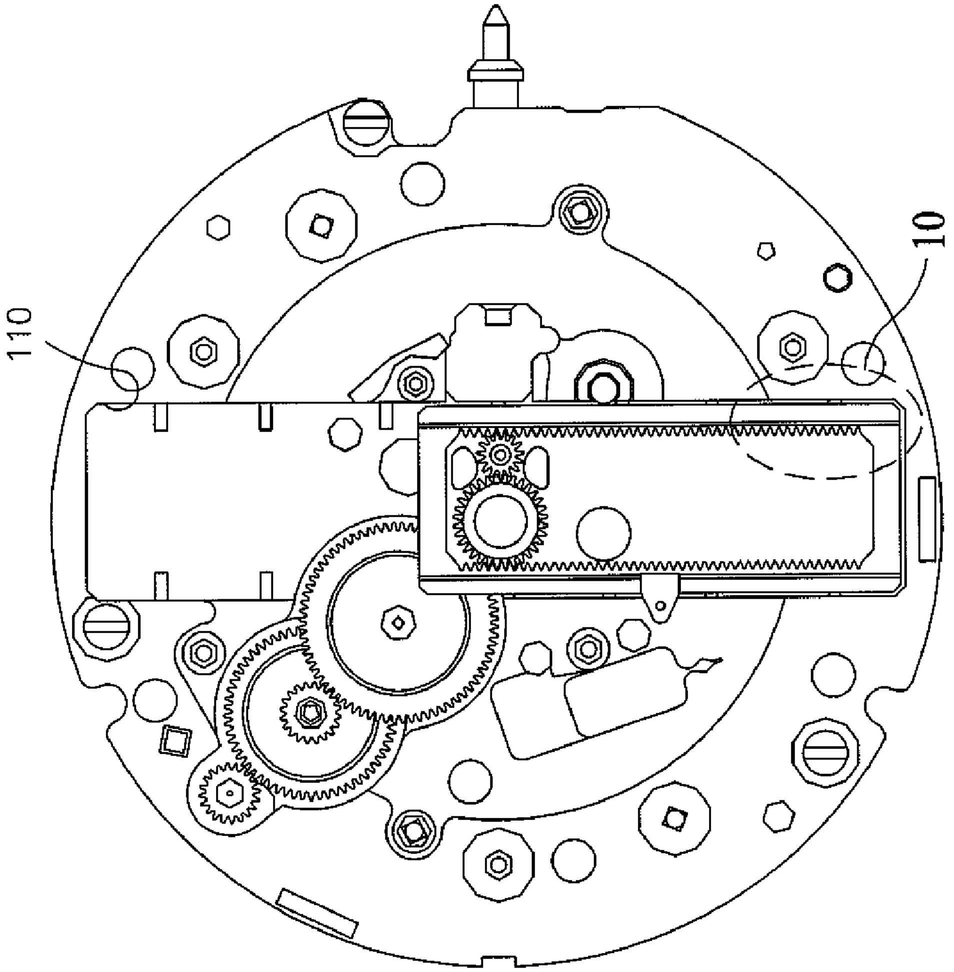
FIG. 6 is a plan view of the module of FIG. 4 and the indicator assembly of FIG. 1.
Figure 7:
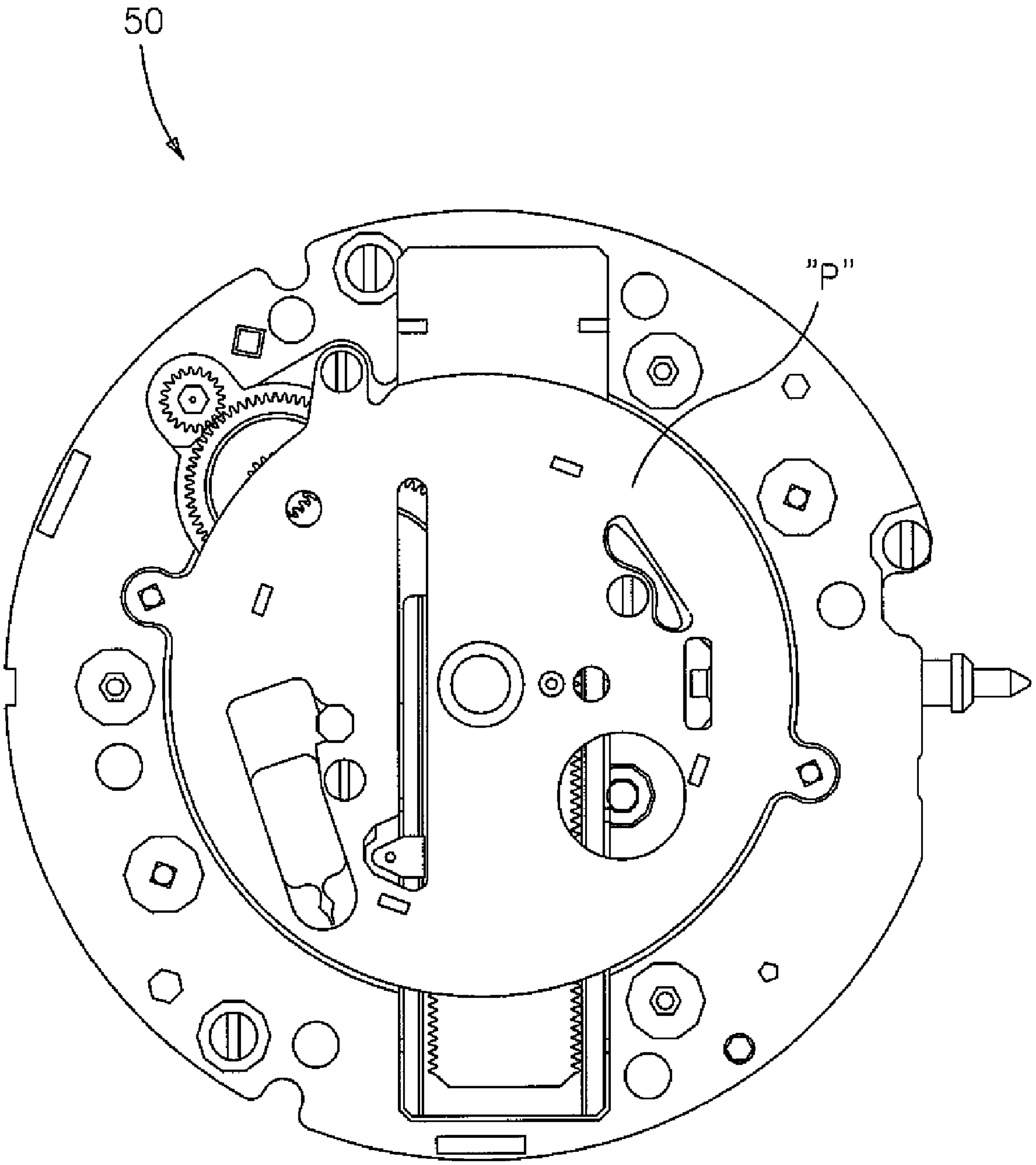
FIG. 7 is another plan view of the module of FIG. 4 and similar to the view of FIG. 6 with the addition of a plate mounted thereon.

FIGS. 6 and 7 are provided to illustrate, among other things, various degrees of completion of wearable electronic device 50, with FIG. 7 differing from FIG. 6 in view of the incorporation of a plate "P."

To provide the proper and accurate controlling, positioning and linear movement of track assembly 12, a controller 100 is provided for causing the actuation mechanism 90 to rotate the one or more gears of the gearing assembly 70 as disclosed above. Preferably, as would be understood in the art, controller 100 is preferably positioned on the opposing side 60*b* of the dial 60. Other details of a controller suitable for the present invention may be found in the aforementioned '450 patent. The added functionality particular to the present invention shall now be disclosed.

Figure 8:
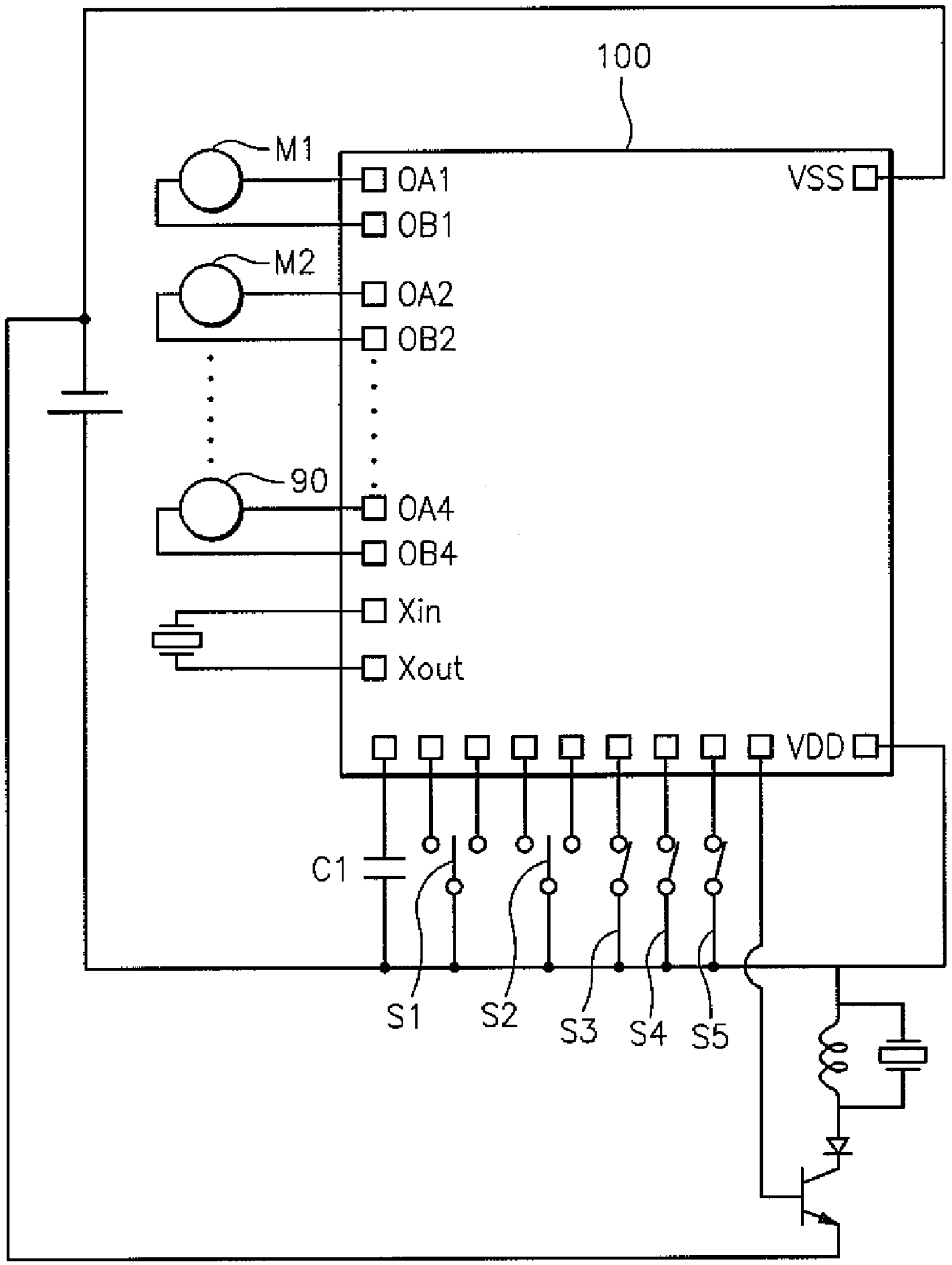
FIG. 8 is a circuit diagram for a wearable electronic device constructed in accordance with a preferred embodiment of the present invention.

General reference may be made to FIG. 8 for a partial block diagram of wearable electronic device 50 of the present invention, which illustrates among other things, interface connections to a plurality of motors, only one of which is material to the present invention (e.g. motor 90). Switches S1-S5 are intended to generically indicate both side/top mounted pushers, as well as side mounted rotatable crowns, and thus respond to the actuation (i.e. pulling and/or pushing) action thereof. In the case of crowns, the pulling and/or pushing actuations may be provided for, among other things, setting the hour and minute hands, setting the position of track assembly 12 and/or calibration thereof (as discussed below). An input/output control circuit (e.g. circuit 110 of FIG. 9) may be provided to control the crown actuations and push-button switches and provides such signaling information to CPU 101.

Figure 9:
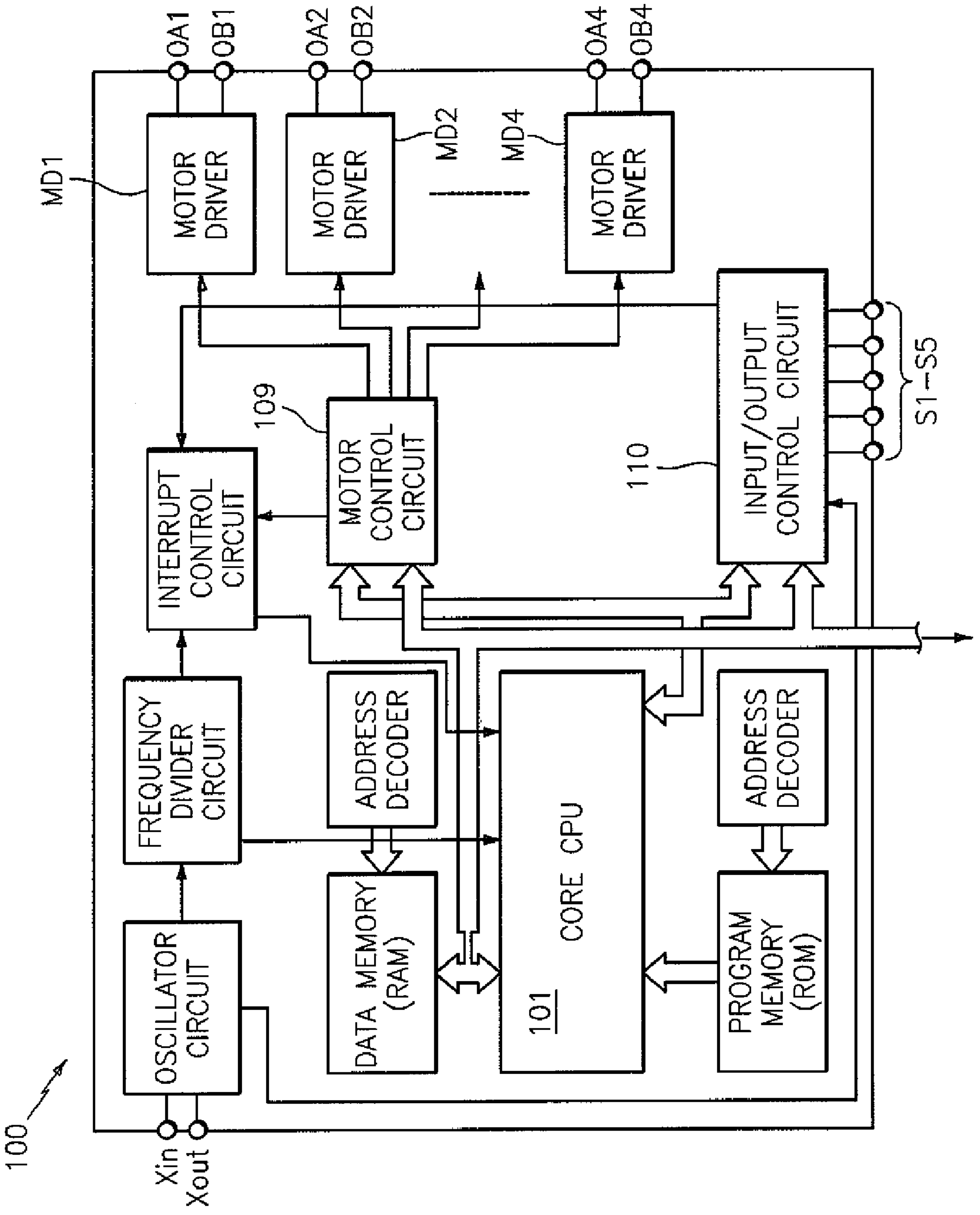
FIG. 9 is a block diagram of a controller for use in a wearable electronic device constructed in accordance with a preferred embodiment of the present invention.

Reference may thus also be made to FIG. 9, which illustrates a block diagram of a controller, generally indicated at 100, constructed in accordance with a preferred embodiment of the present invention. Specific and additional details may be found in the '450 patent, although here, particular reference is made to motor control circuit 109, which receives a commanded "next number of pulses" from CPU core 101 and generates the pulsed and phased signals necessary to move a desired motor (e.g. motor 90) a desired amount and in a desired direction. Pulse outputs of motor control circuit 109 are buffered by the motor drivers (MD1, et seq.) and applied to the respective motors (e.g. motor 90) as appropriate.

Although the preferred embodiment provides that controller 100 is highly integrated wherein all timing and display functionality is controlled in controller 100, alternate embodiments could separate the timekeeping functions from those processing and displaying stored or sensed data, as would be understood by one skilled in the art. In addition, known programming techniques, through software and/or switch actuation sequences if desired, are preferably used to program controller 100 so that it "knows" and/or otherwise maintains accurate displayed information by indicator 32. Such functionality and programming features are well within the purview of one skilled in the art.

Known methodologies also provide for the smooth rotation of gearing assemblies 70, 20. Well known programming techniques such as those described in those documents incorporated by reference herein, set forth acceptable methodologies of ensuring proper, sufficient and accurate stepping of the stepping motor(s). Specifically, these known techniques allow controller 100 to determine whether and when to signal motor control circuit 109 to step the respective stepper motor so that indicator assembly 10 moves linearly, and by how much.

As indicated above, a preferred embodiment of the present invention is in the form of a wristwatch. However, and/or alternatively, wearable electronic device 50 may have, in lieu of and/or in addition to timekeeping functionality, functionality related to altitude, temperature or compass measurements, barometric pressure, heart rate display, blood pressure (and/or combinations thereof), the display of tide information such as whether the tide is high or low, sunset information, moon phases, medical information such as when medicine should be taken and how many pills at each time interval, a count-down timer, or any one of additional parameters such as water pressure, water depth and oxygen left in a diver's tank (i.e. a diver's watch); object finder (i.e. to find one's car or way back to a starting location); blood/sugar levels (a glucometer); speed and distance (a runner's watch); displaying how much money is in a debit account; and any combination of the foregoing, all of which may be in addition to or in the absence of conventional timekeeping functionality.

In a specific (but still exemplary) implementation of the present invention, the indicator assembly displays chrono minutes on a linear 30-minutes scale. In a particular example, indicator 32 may pass through the 30-minute chrono scale twice per hour. It is believed that a 30-minute scale provides sufficient resolution and readability.

In accordance with the foregoing, again all of which are exemplary parameters and not an exhaustive list, surface indicia is provided, preferably in a form such as that indicated generically by indicia 67 on dial 60 (e.g. FIG. 5). Moreover, sensors and/or stored data may be provided and as disclosed in the aforementioned '450 patent in order to provide information (e.g. from the "outside") to be displayed and conveyed by indicating assembly 30 in combination with the surface indicia 67.

And to be clear, the present disclosure omits, for purposes of brevity, certain basic and very well known concepts regarding the construction of an analog timepiece. For example, the basic construction and arrangements of gears and/or gear trains to rotate a plurality of "standard" hands all supported on a center stem, such as an hour hand, a minute hand and a "seconds" hand, will be omitted as being well within the purview of one skilled in the art.

Figure 10:
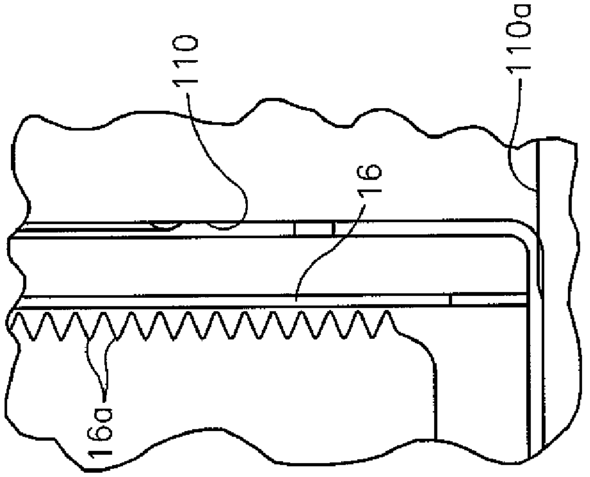
FIG. 10 illustrates a calibration feature in accordance with a preferred embodiment of the present invention.

Reference is also briefly made to FIG. 10, which illustrates another advantageous feature of the present invention. In connection therewith, reference may be had to coowned U.S. Pat. No. 7,266,051, the subject matter of which is incorporated by reference as if fully set forth herein. As illustrated in FIG. 10 and in the aforementioned '051 patent, indicator assembly 10 may be "calibrated." Calibration, if any, assists in permitting controller 100 to "know" the position of indicator assembly 10.

In this particular embodiment, the module of electronic device 50 may have a channel 110 into which track assembly 12 is positioned. Channel 110 also provides further guiding and support for track assembly 12. A bottom edge 110*a* thereof may be provided as a "stopper" against which track assembly 12 will be "pinned" when moved all the way in a particular direction (e.g. direction "y" of FIG. 1). Using the techniques and methodologies in the aforementioned '051 patent, it is possible for indicating assembly 30 to return to the "zero" position and/or otherwise be positioned correctly.

In accordance with yet another modification of a preferred embodiment, the dial may be provided with one or more windows. In such an embodiment, one or more LCD panels may be provided behind the dial 60 and aligned with the respective window(s). With such a display feature, the LCD display can display various scales that are particular to the desired displayable information. In this way, a single wearable electronic device can be manufactured with all of the aforementioned modes being selectively displayable on one display and in one wearable electronic device. The mode can easily be displayed in the window(s) of the dial, thus allowing the user an ability to see the modes through which he/she is cycling. In a similar manner, the scales for a single mode can vary as well, since one skilled in the art would know how to excite the appropriate LCD crystals to have a scale, grid or other measuring design appear on the LCD panel. Controller 100, knowing the mode, the scale appearing on LCD panel, and the position of the rotor for motor 90, could coordinate the display such that any mode could be displayed by the use of differing displayable scales. Again, the aforementioned ’450 patent, which is incorporated by reference herein, describes many details of this feature and possible methods and constructions to incorporate sensors, etc. to take advantages of the present invention disclosed herein.

However, even without such an LCD display behind the dial, the present invention is well suited for the display and conveying of information related to a variety of parameters such as heart rate, as but just one example. However, with such an incorporated feature of an LCD, it may be possible to provide a heart rate scale (e.g. 40-220) that is wider than the window thereby permitting larger indicia to be provided. In this way, the user may be provided a way to make it easier and/or more convenient to see one’s heart rate by providing that the visible scale can change during a workout. Such an embodiment may be advantageous when, practically speaking, during a workout, different parts of the scale are applicable at different times. Again, with controller 100 maintaining accurate indicating assembly 30 positioning and/or calibration, such display versatility is possible.

In the preferred embodiment, at least motor 90 is a bi-directional stepper motor thus being able to rotate in either direction, and the construction of acceptable stepper motors to functionally operate in this manner are widely available and well within the understanding of those skilled in the art. Suitable dials are also well within the purview of the skilled artisan. One skilled in the art would also recognize that varying the number of indicators can vary the number of needed stepper motors, all of which is within the scope of the present invention and disclosure and disclosed in those applications incorporated by reference herein.

As should also be appreciated by one skilled in the art, the location, position and/or size of the indicator is merely dictated, for example, by the position of pinions and associated gears as well as other subassemblies and thus the illustrations herein are shown by example and not limitation.

The gearing ratio to provide for the desirable display rotation or movement of the display hands or rings would be one of design choice depending on the desired or required incremental rotation or movement of the display indicator. Thus the number of gears in any particular gearing assembly may be more or less than that disclosed herein, and are really one of design choice for the intended function and based upon a number of criterions known to the ordinary designer. Also, the functionality of the controller can be modified to accommodate the varying embodiments disclosed herein by software-programming techniques or differing controllers, both of which is well within the purview of the skilled artisan.

It can thus be seen that the present invention provides for an improved method and construction of a linear indicator for displaying information such as information associated with parameters such as those disclosed herein.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

What is claimed is:

1. An indicator assembly for a wearable electronic device, wherein the electronic device comprises a dial having (i) a dial side and an opposing side, (ii) a slotted opening therein and (iii) surface indicia to which an indicator can point and convey information thereby, a gearing assembly positioned on the opposing side of the dial and comprising one or more rotatable gears, an actuation mechanism positioned on the opposing side of the dial for rotating the one or more gears of the gearing assembly and a controller positioned on the opposing side of the dial for causing the actuation mechanism to rotate the one or more gears of the gearing assembly, wherein the indicator assembly comprises:

a track assembly comprising a first track and a second track spaced apart and aligned parallel thereto, wherein each track includes teeth running along at least a respective portion thereof, wherein the teeth of the respective tracks are in facing alignment;

a track assembly gearing assembly that meshingly engages the teeth of the first and second tracks and the gears of the gearing assembly, wherein the first and second tracks move linearly and at least essentially at the same rate;

an indicating assembly coupled to the track assembly and extending through the slotted opening in the dial, wherein the linear movement of the track assembly causes the indicating assembly to move linearly in the slotted opening, wherein the indicating assembly comprises an indicator;

whereby the indicator conveys information by referring to particular surface indicia on the dial.

2. The indicator assembly as claimed in claim 1, wherein the track assembly gearing assembly comprises a first gear having teeth on an outer circumference thereof and a second gear having teeth on an outer circumference thereof, wherein (i) the first gear meshingly engages the teeth of the first track and one of the gears of the gearing assembly and (ii) the second gear meshingly engages the teeth of the second track and the teeth of the first gear, and wherein the rate of rotation of the first and second gears causes the first and second tracks to move linearly, at least at essentially the same rate and in at least essentially the same direction.

3. The indicator assembly as claimed in claim 1, wherein the actuation mechanism comprises a stepper motor that itself comprises a rotor, the stepper motor operatively coupled to the controller, for stepping in at least one of a clockwise and counterclockwise direction in predefined increments.

4. The indicator assembly as claimed in claim 1, wherein the first track and second track are integrally coupled together to form a frame.

5. The indicator assembly as claimed in claim 1, wherein the information being conveyed are minute intervals.

6. The indicator assembly as claimed in claim 1, wherein the indicating assembly is integrally formed with the track assembly and the indicator is integrally formed with the track assembly.

7. The indicator assembly as claimed in claim 1, wherein the indicator is coupled to the track assembly via a stud.

8. A wristwatch incorporating the indicator assembly as claimed in claim 1.

9. A wearable electronic device comprising:

a dial having (i) a dial side and an opposing side, (ii) a slotted opening therein and (iii) surface indicia to which an indicator can point and convey information thereby;

a gearing assembly positioned on the opposing side of the dial and comprising one or more rotatable gears;

an actuation mechanism positioned on the opposing side of the dial for rotating the one or more gears of the gearing assembly;

a controller positioned on the opposing side of the dial for causing the actuation mechanism to rotate the one or more gears of the gearing assembly; and an indicator assembly comprising:

a track assembly comprising a first track and a second track spaced apart and aligned parallel thereto, wherein each track includes teeth running along at least a respective portion thereof, wherein the teeth of the respective tracks are in facing alignment;

a track assembly gearing assembly that meshingly engages the teeth of the first and second tracks and the gears of the gearing assembly, wherein the first and second tracks move linearly and at least essentially at the same rate; and an indicating assembly coupled to the track assembly and extending through the slotted opening in the dial, wherein the linear movement of the track assembly causes the indicating assembly to move linearly in the slotted opening, wherein the indicating assembly comprises an indicator;

whereby the indicator conveys information by referring to particular surface indicia on the dial.

10. The wearable electronic device as claimed in claim 9, wherein the track assembly gearing assembly comprises a first gear having teeth on an outer circumference thereof and a second gear having teeth on an outer circumference thereof, wherein (i) the first gear meshingly engages the teeth of the first track and one of the gears of the gearing assembly and (ii) the second gear meshingly engages the teeth of the second track and the teeth of the first gear, and wherein the rate of rotation of the first and second gears causes the first and second tracks to move linearly, at least at essentially the same rate and in at least essentially the same direction.

11. The wearable electronic device as claimed in claim 10, wherein the wearable electronic device is a wristwatch.

12. The indicator assembly as claimed in claim 10, wherein the indicating assembly is integrally formed with the track assembly and the indicator is integrally formed with the track assembly.

13. The indicator assembly as claimed in claim 10, wherein the indicator is coupled to the track assembly via a stud.

14. An indicator assembly for a wearable electronic device, wherein the electronic device comprises means by which indicia is visible and to which an indicator can point and convey information thereby, a gearing assembly comprising one or more rotatable gears, an actuation mechanism for rotating the one or more gears of the gearing assembly and a controller for causing the actuation mechanism to rotate the one or more gears of the gearing assembly, wherein the indicator assembly comprises:

a track assembly comprising a first track and a second track spaced apart and aligned parallel thereto, wherein each track includes teeth running along at least a respective portion thereof, wherein the teeth of the respective tracks are in facing alignment;

a track assembly gearing assembly that meshingly engages the teeth of the first and second tracks and the gears of the gearing assembly, wherein the first and second tracks move linearly and at least essentially at the same rate;

an indicating assembly coupled to the track assembly, wherein the linear movement of the track assembly causes the indicating assembly to move linearly, and wherein the indicating assembly comprises an indicator;

whereby the indicator conveys information by referring to particular indicia visible to the user.

15. The indicator assembly as claimed in claim 14, wherein:

the wearable electronic device comprises a dial having a dial side and an opposing side and a slotted opening therein, the gearing assembly is positioned on the opposing side of the dial, the actuation mechanism is positioned on the opposing side of the dial, and the controller is positioned on the opposing side of the dial; and the indicator extends through the slotted opening in the dial.

16. A wearable electronic device comprising an indicator assembly as claimed in claim 14.

17. A wearable electronic device comprising an indicator assembly as claimed in claim 15.

* * * * *